(No Model.)

J. COCHRAN.
BUSHING FOR SHEAVES OF PULLEY BLOCKS.

No. 282,056. Patented July 31, 1883.

Witnesses:
T. H. Carson
J. R. Drake

James Cochran
Inventor, by
J. R. Drake,
Atty.

UNITED STATES PATENT OFFICE.

JAMES COCHRAN, OF LOCKPORT, NEW YORK.

BUSHING FOR SHEAVES OF PULLEY-BLOCKS.

SPECIFICATION forming part of Letters Patent No. 282,056, dated July 31, 1883.

Application filed March 27, 1883. (No model.)

*To all whom it may concern:*

Be it known that I, JAMES COCHRAN, a citizen of the United States of America, residing at Lockport, in the county of Niagara and State of New York, have invented certain new and useful Improvements in Bushings for Sheaves of Pulley-Blocks, of which the following is a specification, reference being had therein to the accompanying drawings.

This invention relates to pulley-blocks, the sheave of which has a series of anti-friction rollers running in the hub, usually in direct contact with the pin or axle on which the pulley runs, and the invention will be understood, as hereinafter set forth and claimed.

Heretofore it has been attempted to protect the shaft from the wear of the pulleys by the introduction of a bushing to take the direct friction of the pulleys. The bushing alluded to was set back of the confining-rings at the end, and the shaft as well as these confining-rings received much wear. In my device the bushing is thick enough to project inward toward the center beyond the confining-rings, so that the entire contact occurs between the bushing and the shaft, and there is no opportunity for wear between the other parts and the shaft. In my device the collars or rims in which the roller-shafts are secured extend over a portion of the thickness of the bushing-ring.

Figure 1:
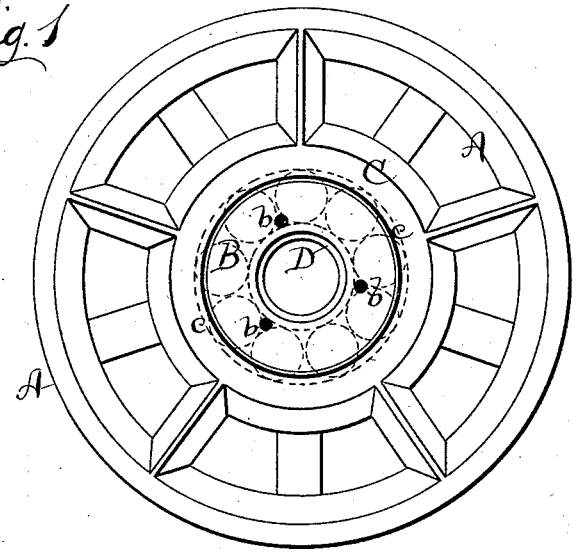
Figure 2:
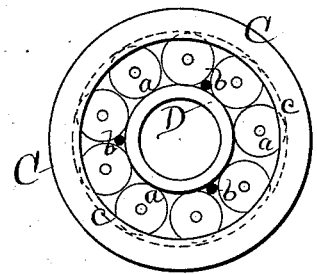
Figure 3:
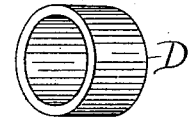
Figure 4:
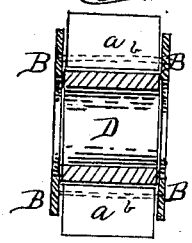

In the drawings, Figure 1 is a plan of the sheave or pulley with my bushing therein; Fig. 2, a detail, being the hub removed, showing the position of the rollers and my bushing; Fig. 3, a perspective of the bushing separate. Fig. 4 is a section of the bushing and holding-rings, showing two rollers in place, the pulley being omitted.

A represents the sheave or pulley, its central annular space occupied by a series of anti-friction rollers, *a a a*, provided with short axial sockets at both ends, to receive loosely the projecting nibs (not shown) fastened to the inside of the collars or rims B—one each side of rollers—and which (collars) are held together by pins or rivets *b b b*, thus keeping the rollers in place, aided by the projection or flange *c* of the hub C, which comes over the upper edges of the rollers, as shown in Figs. 1 and 2. To avoid having the axle or pin come directly in contact with the surfaces of the rollers *a a*, I provide an anti-friction bushing, D, which is merely a metal (brass) ring just the width of the rollers, and thick enough to project a little beyond the confining-rims B B, which also hold this bushing in place by forming a flange or extension which projects over the edge of the bushing a little; but the width of the edge of said bushing allows it to project a little beyond the edge of the rim B. This prevents the axle grinding the rim. Thus the rim B keeps in place the friction-rollers, and also the annular bushing D, as shown in Fig. 1, the rollers dotted through.

In Fig. 2 the hub is shown separate from the pulley, and with the rim B removed also, to better show the rollers *a a* and their contact with the bushing D.

The advantages of this separate bushing-ring D are that I get an even and larger bearing-surface for the pin or axle, and it also gives the rollers a smooth surface to roll on inside and outside, thus preventing rattling. It also saves greatly in wear on the pin, preventing the rollers cutting into it, as is usually the case when they have direct contact with the pin or axle.

What I claim is—

The combination, with a sheave having the anti-friction rollers *a a* and the annular loose bushing-ring D, extending inward toward the center of the pulley or sheave, past the holding rims or collars, so that the bushing-ring alone comes in contact with the shaft, of the two rims or collars B at each end, and the pins *b*, for joining them, substantially as set forth.

In testimony whereof I affix my signature, in presence of two witnesses, this 27th day of January, 1883.

JAMES COCHRAN.

Witnesses:
BURT VAN HORN,
E. A. HOLT.